United States Patent [19]

Gretchev

[11] Patent Number: 4,494,129

[45] Date of Patent: Jan. 15, 1985

[54] ELECTROSTATIC PRINTING APPARATUS

[75] Inventor: Vladimir Gretchev, Thornhill, Canada

[73] Assignee: Delphax Systems, Mississauga, Canada

[21] Appl. No.: 446,821

[22] Filed: Dec. 3, 1982

[30] Foreign Application Priority Data

Dec. 4, 1981 [CA] Canada ..................... 391,543

[51] Int. Cl.[3] ............................................ G01D 15/06

[52] U.S. Cl. .................................... 346/154; 346/159

[58] Field of Search ....................... 346/154, 159, 155; 358/300

[56] References Cited

U.S. PATENT DOCUMENTS

| | | | |
|---|---|---|---|
| 3,072,046 | 1/1963 | Shull | 346/154 X |
| 4,267,556 | 5/1981 | Fotland et al. | 346/155 X |
| 4,430,661 | 2/1984 | Taromi et al. | 346/153.1 |

*Primary Examiner*—Thomas H. Tarcza
*Attorney, Agent, or Firm*—Hirons, Rogers & Scott

[57] ABSTRACT

Apparatus for processing a digital raster scan signal for use by an electrostatic printer having a print cartridge with an ion deposition matrix composed of sixteen drive electrodes intersected by 128 finger electrodes is described. A digital input signal, representing a line of raster scan data, is reformatted to be compatible with this print cartridge. This is achieved by reformatting the signal into sixteen data groups, each containing 128 bits and storing at least sixteen data groups at any one time in a memory. A motion control circuit responds to signals from the memory circuit, from the rotation of the drum and from paper sensors to effect scanning of the ion deposition matrix in a timed sequence. One of the drive electrodes and all 128 finger electrodes are energized by one data group at any one time to effect ion deposition as the drum rotates, then the next drive electrode and the next data group are energized. This is repeated until the entire matrix is scanned. Since the ion deposition locations are offset from each other, sequential energization as the drum rotates results in a single line of charge deposited on the drum corresponding to a line of an image represented by raster scan data. In this way an electrostatic image is built up on the drum, and is then formed into a toner image which finally is transferred onto a copy material.

7 Claims, 12 Drawing Figures

STORAGE OF RASTER SCAN SIGNAL IN INTERFACE MEMORY

| ADR | RAM1 | | | | RAM2 | | | | RAM3 | | | | RAM4 | | | |
|---|---|---|---|---|---|---|---|---|---|---|---|---|---|---|---|---|
| 0 | 0 | 1 | 2 | 3 | 16 | 17 | 18 | 19 | 32 | 33 | 34 | 35 | 48 | 49 | 50 | 51 |
| 1 | 4 | 5 | 6 | 7 | 20 | 21 | 22 | 23 | 36 | 37 | 38 | 39 | 52 | 53 | 54 | 55 |
| 2 | 8 | 9 | 10 | 11 | 24 | 25 | 26 | 27 | 40 | 41 | 42 | 43 | 56 | 57 | 58 | 59 |
| 3 | 12 | 13 | 14 | 15 | 28 | 29 | 30 | 31 | 44 | 45 | 46 | 47 | 60 | 61 | 62 | 63 |
| 4 | 64 | 65 | 66 | 67 | 80 | 81 | 82 | 83 | 96 | 97 | 98 | 99 | 112 | 113 | 114 | 115 |
| 5 | 68 | 69 | 70 | 71 | 84 | 85 | 86 | 87 | 100 | 101 | 102 | 103 | 116 | 117 | 118 | 119 |
| 6 | 72 | 73 | 74 | 75 | 88 | 89 | 90 | 91 | 104 | 105 | 106 | 107 | 120 | 121 | 122 | 123 |
| 7 | 76 | 77 | 78 | 79 | 92 | 93 | 94 | 95 | 108 | 109 | 110 | 111 | 124 | 125 | 126 | 127 |
| 8 | 128 | 129 | 130 | 131 | 144 | 145 | 146 | 147 | 160 | 161 | 162 | 163 | 176 | 177 | 178 | 179 |
| 9 | 132 | 133 | 134 | 135 | 148 | 149 | 150 | 151 | 164 | 165 | 166 | 167 | 180 | 181 | 182 | 183 |
| A | 136 | 137 | 138 | 139 | 152 | 153 | 154 | 155 | 168 | 169 | 170 | 171 | 184 | 185 | 186 | 187 |
| B | 140 | 141 | 142 | 143 | 156 | 157 | 158 | 159 | 172 | 173 | 174 | 175 | 188 | 189 | 190 | 191 |
| C | 192 | 193 | 194 | 195 | 208 | 209 | 210 | 211 | 224 | 225 | 226 | 227 | 240 | 241 | 242 | 243 |
| D | 196 | 197 | 198 | 199 | 212 | 213 | 214 | 215 | 228 | 229 | 230 | 231 | 244 | 245 | 246 | 247 |
| E | 200 | 201 | 202 | 203 | 216 | 217 | 218 | 219 | 232 | 233 | 234 | 235 | 248 | 249 | 250 | 251 |
| F | 204 | 205 | 206 | 207 | 220 | 221 | 222 | 223 | 236 | 237 | 238 | 239 | 252 | 253 | 254 | 255 |
| 10 | 256 | 257 | 258 | 259 | 272 | | | | 288 | | | | 304 | | | |
| 11 | 260 | | | | 276 | | | | 292 | | | | 308 | | | |
| 12 | 264 | | | | 280 | | | | 296 | | | | 312 | | | |
| 13 | 268 | | | | 284 | | | | 300 | | | | 416 | | | |

DATA GROUP G0 = (0,16,32,48,64,80,96,...............2032)

DATA GROUP G1 = (1,17,33,49,65,81,97,...............2033)

DATA GROUP G15 = (15,31,47,63,79,95,111,............2047)

FIGURE 9

ELECTROSTATIC PRINTING APPARATUS

FIELD OF THE INVENTION

The present invention relates to electrostatic printing apparatus and, more particularly, to a system for producing a latent electrostatic image in response to a digital input signal representing successive raster scan lines.

The electrostatic printing apparatus and system may be utilized, in conjunction with optical scanning apparatus, e.g. laser, for scanning an original image which is to be copied, or in conjunction with data processing apparatus for producing the digital input signal, for example, in response to input signals from a keyboard.

DESCRIPTION OF THE PRIOR ART

In an electrostatic printing process, a pattern of charge corresponding to a desired image is formed as a latent electrostatic image on a dielectric surface, for example, the surface of a electrostatically chargeable drum or image cylinder. The dielectric surface is first moved past a toner brush to cause toner of opposite charge to adhere to the charged areas of the dielectric surface and, thus, to form a toner image. The drum is rotated and the toner image is then transferred and fused simultaneously, or in separate operations, to a copy material, e.g. a copy paper. After the transfer and fusing operation, the dielectric surface is then treated to remove any residual toner and electrostatic charge.

In recent years, there has been developed an ion deposition apparatus in which free ions are generated in the air by applying high frequency voltage between electrodes.

In particular, U.S. Pat. No. 4,155,093, issued May 15, 1979 to Richard A. Fotland et al discloses the generation of ions by extracting the ions from a high density source provided from breakdown of a gas by an electrical field between two conducting electrodes separated by an insulator. By applying a varying potential difference across the electrodes, an electrical discharge is produced and ions are extracted from the discharge by a d.c. potential which provides an electric field between one of the electrodes and a dielectric material, so that the ions are transferred to the dielectric material.

In order to provide an image of sufficient resolution on the copy material by depositing the image in the form of dots, it is of course necessary to make the dots sufficiently small and to provide a sufficient number of the dots side by side or in-line. However, the provision of a large number of small dots adjacent one another presents problems; the physical size of the components of the printing head limis the number of dots which can be formed close together and, a separate voltage driven would have to be provided for each dot, which is impractical and expensive.

These problems can be mitigated by the use of print cartidge having a matrix ion generator and by the use of two groups of electrodes, which are transverse to each other in a common plane.

U.S. Pat. No. 4,155,093 discloses a matrix ion generator for the formation of characters by dot matrix electrical changes on a dielectric surface. The matrix ion generator comprises a sheet of dielectric material provided with electrodes on opposite sides thereof, the electrodes on the side of the dielectric material nearest the surface on which the charge is to be deposited having apertures through which the ions can be discharged, in the above-described manner, onto complementary areas of the dielectric surface. With this matrix-ion generator, the physical constraints on the size of the print head and the number of voltage drivers required for generating the ions can be substantially reduced.

U.S. Pat. No. 4,160,257, issued July 3, 1979 to Geoffery J. Carrish discloses an ion generator in which, in addition to a high frequency potential applied between a first 'driver electrode and a second' control electrode, separated by a dielectric member, a lesser constant potential is applied to a screen electrode, which is separated from the control electrode by a second layer of dielectric material. However, the system for controlling the operation of the print cartridge was inadequate to enable printed data to be produced at very fast rates, and the advantages of the print cartridge and ion deposition matrix design were not realised.

U.S. Pat. No. 4,267,556, issued May 12, 1981 to Richard A. Fotland et al discloses a multiplexed ion generator with finger electrodes and drive electrodes, the drive electrodes are located transverse to the finger electrodes in a common plane. Gated oscillators apply high voltage alternating current to the drive electrodes and pulse generators for applying d.c. potentials to the finger electrodes to generate ions, a counter being provided for controlling the gated oscillators. With this design, the manufacture of the print cartridge was made practical and economic.

OBJECTS OF THE INVENTION

It is an object of the present invention to provide improved electrostatic printing apparatus provided with novel means for controlling the operation of an ion deposition matrix.

It is a further object of the present invention to provide an electrostatic printing apparatus for producing a latent electrostatic image in response to a digital input signal representing successive raster scan lines.

BRIEF SUMMARY OF THE INVENTION

According to the present invention apparatus is provided controlling the operation of a matrix of ion deposition points of an electrostatic printer, the ion deposition points being defined by the intersection of a plurality of first electrodes with a plurality of second electrodes to provide a pattern of charge on a rotatable electrostatically chargeable surface corresponding to an image represented by a digital raster scan signal, the plurality of first electrodes being parallel to the axis of rotation and the plurality of second electrodes being located transverse to said plurality of first electrode in a common plane, the apparatus comprising:

data reformatting means for receiving a digital raster scan input signal and processing the digital input signal into a plurality of data groups, the data groups being in a form compatible with the physical arrangement of the electrodes, memory means connected to the data reformatting means for storing the data groups, and motion control means responsive to the rotation of the chargeable surface to initiate a scanning operation to energise, in a predetermined sequence, the matrix of ion deposition points.

The ion deposition matrix comprise a plurality of first parallel electrodes extending parallel to the axis of rotation of the drum and a plurality of second parallel electrodes extending across the first electrodes. Intersections between the first and second electrodes define ion deposition points, and the second electrodes are transverse to the first electrodes in a common plane forming a matrix of ion deposition points across the path of rotation of the drum.

A system is provided for reformatting the digital input signal into data groups, where each data group corresponds to a respective group of data points on one of the raster scan lines, and also corresponds to the ion deposition points on a respective one of the first electrodes. The apparatus also includes a memory for storing the data groups, and means for producing a timing signal in response to the rotation of the drum. The first electrode drive means energize the first electrodes in timed relation to the timing signal and the second electrode drive means for energizes the second electrodes in timed relation to the timing signal and in accordance with the stored data groups to effect ion deposition on the drum from the ion deposition points.

Thus, by the present invention, each of the data groups into which the digital input signal is reformatted corresponds to respective data points, which are spaced apart from each other by a predetermined number of points along a raster scan line, thus enabling the ion deposition points on the first and the second electrodes to be correspondingly spaced apart.

In operation of the apparatus, ion deposition is effected along the first electrodes at lines which, like the first electrodes, are spaced apart a distance greater than the spacing of raster scan lines corresponding to the digital input signal. Consequently, the first electrodes are energized, and ions are selectively deposited along the first electrodes, each time the first electrodes are coincident with print lines.

BRIEF DESCRIPTION OF THE DRAWINGS

Further features, objects and advantages of the present invention will be more readily apparent from the following description of the preferred embodiment thereof given, by way of example, with reference to the accompanying drawings, in which:

FIG. 9 shows a table of how the digital raster scan input data is reformatted in the data assembler of the interface card shown in FIG. 8;

DESCRIPTION OF THE PREFERRED EMBODIMENT

Figure 1:
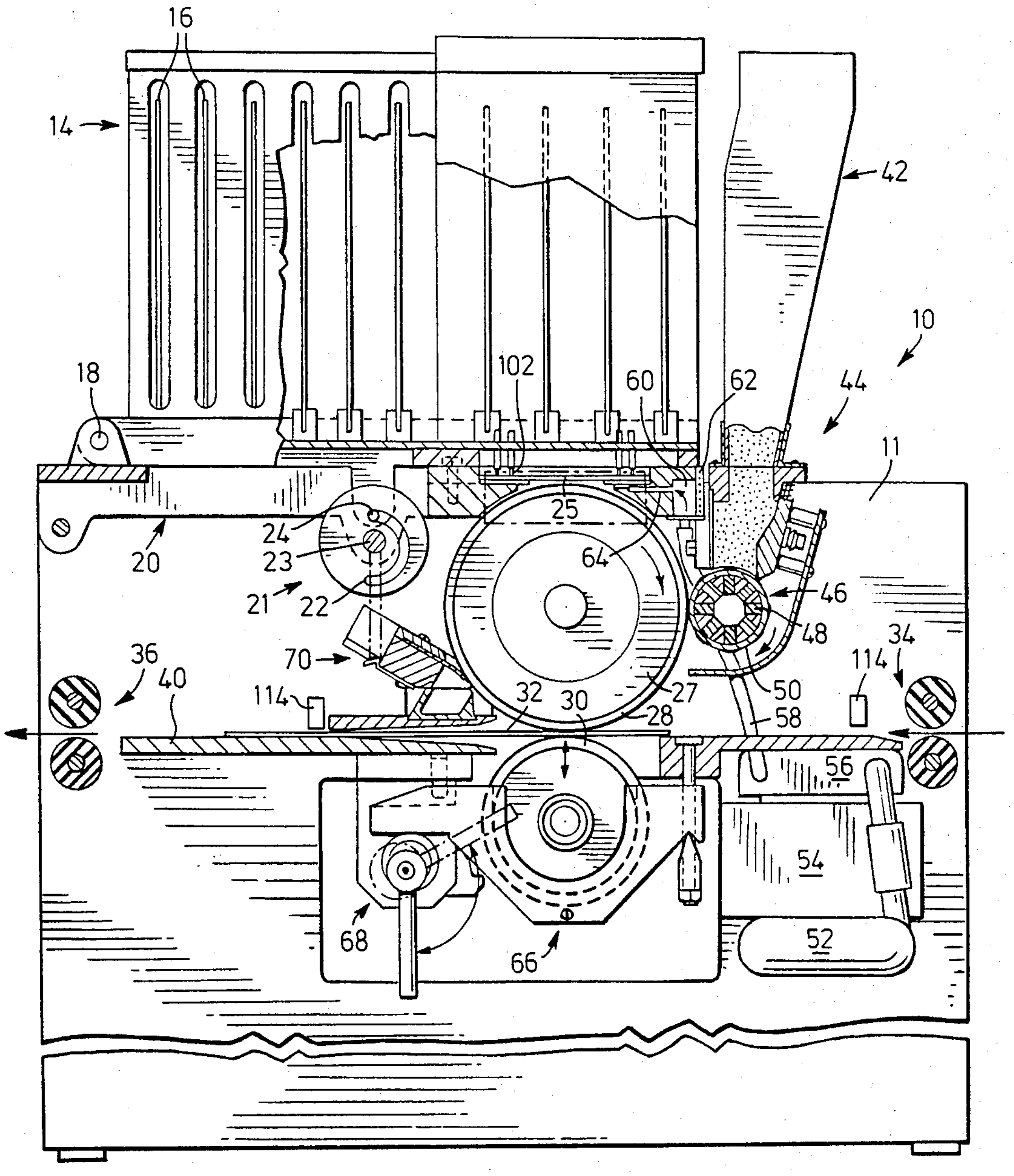
FIG. 1 shows a view in vertical cross-section through an electrostatic printing apparatus.

Referring firstly to FIG. 1 of the accompanying drawings, the electrostatic printing apparatus is indicated generally by reference numeral 10 and a pair of opposed side walls, of which one is indicated by reference numeral 11 and which support at their tops a housing indicated generally by reference numeral 14, the housing 14 containing a plurality of printed circuit boards 16 controlling the operation of the apparatus.

The housing 14 is pivotally supported by a pair of pivots, which are arranged at opposite sides of the housing 14 and only one of which is shown and is indicated generally by reference numeral 18, these pivots providing a pivotal connection between the housing 14 and a pivotal support frame 20.

A cam and cam follower mechanism, indicated generally by reference numeral 21 and comprising a rotary cam 22 mounted on the shaft 23 journalled in the pivotal support frame 20 and a laterally projecting cam follower pin 24 secured to the underside of the housing, is provided for pivoting the housing 14 upwardly through a small distance relative to the pivotal support frame 20 to enable insertion and removal of a rectangular print cartridge 25 incorporating an ion deposition matrix and an erase head, as described in greater detail below.

A drum or cylinder 27 having an electrostatically chargeable peripheral surface layer 28 co-operates with an underlying pressure cylinder or roller 30 to define a nip, through which passes a copy paper sheet 32.

A pair of in-feed rollers indicated generally by reference numeral 34 and a pair of outfeed rollers indicated generally by reference numeral 36 are provided for feeding the copy paper sheet 32 over a pair of guide plates 38 and 40 to and from the nip between the electrostatically chargeable cylinder 27 and the pressure cylinder 30.

A hopper indicated generally by reference numeral 42 supplies toner powder through a hopper outlet indicated generally by reference numeral 44 to a toner applicator roller indicated generally by reference numeral 46.

The toner applicator roller 46 comprises a plurality of permanent magnets 48 within a cylinder 50, which rotates in a direction of rotation opposite to that of the electrostatically chargeable cylinder 27, as indicated by arrows in FIG. 1.

An air impeller 52 draws air from the exterior of the electrostatic printing apparatus 10 and drives the air through a dehumidifer or condenser 54, for removing moisture from the air, and through a preheater 56, for heating the air. From the preheater 56, the dehumidified and preheated air passes through a pipe 58 to a manifold chamber 60, provided in the pivotal support frame 20 and having an electrical resistance heater 62 for additional heating of the air.

From the chamber 60, the air is discharged through a plurality of air outlet passages, of which only one is shown and is indicated by reference numeral 64, spaced apart along the length of the electrostatically chargeable drum 27, the discharged air passing between the periphery of the drum 27 and the sheet-shaped insert 25 for removing chemical contaminants produced by the operation of the latter and for heating the periphery of the drum 27 to counteract the deposition of condensation products of such chemical contaminants on the drum periphery.

The pressure cylinder 30 is supported in a cradle mechanism indicated generally by reference numeral 66 which, in turn, is vertically adjustable by means of an eccentric cam mechanism, indicated generally by reference numeral 68. The mechanisms 66 and 68 do not form part of the present invention and are therefore not described in greater detail herein.

A scraper indicated generally by reference numeral 70 is provided for removing residual toner powder from the periphery of the electrostatically chargeable drum 27.

The operation of the above-described apparatus is as follows:

By means of the ion deposition matrix of the print cartridge 25, controlled by the printed circuit boards 16 as described below, a latent electrostatic image is formed in the dielectric layer 28 on the periphery of the drum 27.

As the drum 27 rotates, toner powder is applied to the latent electrostatic image by the toner applicator roller 46 to form a toner powder image on the drum periphery.

This toner powder image is then simultaneously transferred and fused to the copy paper sheet 32 at the nip between the rollers 27 and 30, the axes of which are slightly skewed, to facilitate transfer and fixing of the toner image onto the copy paper.

Any residual toner powder adhering to the drum periphery is removed by the scraper 70 and any residual electrostatic image on the drum periphery is removed by the erase head of the print cartridge 25.

Figure 2:
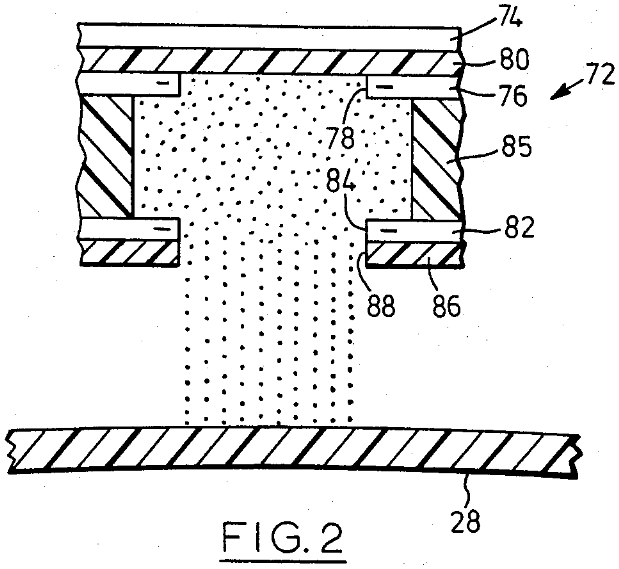
FIG. 2 PRIOR ART
FIG. 2 shows a diagrammatic view in cross-section through a prior art ion generator forming part of the print cartridge of the apparatus of FIG. 1.

The latent electrostatic image on the dielectric layer 28 is formed by the ion deposition matrix as a multiplicity of discrete charge points and the formation of one of such discrete charge points is diagrammatically illustrated in FIG. 2.

As illustrated in FIG. 2, which shows an ion generator comprising a broken-away portion, indicated generally by reference numeral 72, of the print cartridge 25, the ion generator comprises a drive line or electrode 74, a finger electrode 76, interrupted by a circular opening 78, a layer 80 of dielectric material between the drive electrode 74 and the finger electrode 76, a screen electrode 82, formed with a circular opening 84 in alignment with the opening 78, and a layer 85 of dielectric material interposed between the screen electrode 82 and the finger electrode 76. The openings 78 are spaced about 1/240 inch apart in the direction of the driver axis and about 3/240 inch in the direction of drum rotation. This gives a slope of about 3 which has been found to give the smallest practical active area of the head so that the curvature of the drum does not affect operation of the print cartridge 25.

During operation of the ion generator, a cloud of free ions is created in the opening 78 by means of a high frequency electric field (1 $MH_Z$, 2300–2700 volts peak to peak), and a second field is employed to accelerate a small portion of these ions, through the orifice formed by the opening 84, onto the dielectric layer 28 of the cylinder 27.

The deposition of ions in this way is disclosed in the aforementioned U.S. Pat. No. 4,160,257.

The present electrostatic printing apparatus 10 is intended to receive an input signal in the form of a digital raster scan signal, derived for example from a laser scanning device or other scanning device or by a computer, and to convert the digital raster scan signal to visible print on the copy paper sheet 32.

Apparatus for producing a raster scan signal, is considered well known to those skilled in the art, and does not form part of the present invention.

Considering now the image composed of dots which is to be built up on the copy paper 32 by the multiplicity of changes provided by the ion deposition matrix, a density of 240 dots per inch is required to produce a satisfactory printed image. 240 dots per inch is generally considered a standard density. Therefore, on a page width of 8½ inches, 2,040 dots are required. As explained before the formation of such a large number of dots present two major problems. Firstly, the space available on the print cartridge 25 for the orifices, such as the opening 84, for forming each of the dots and the circuitry and connections required for controlling such orifices within the apparatus 10 is limited. Secondly, it would be impractical to provide 2,040 separate circuits for controlling the orifices due to cost and reliability problems.

Figure 3:
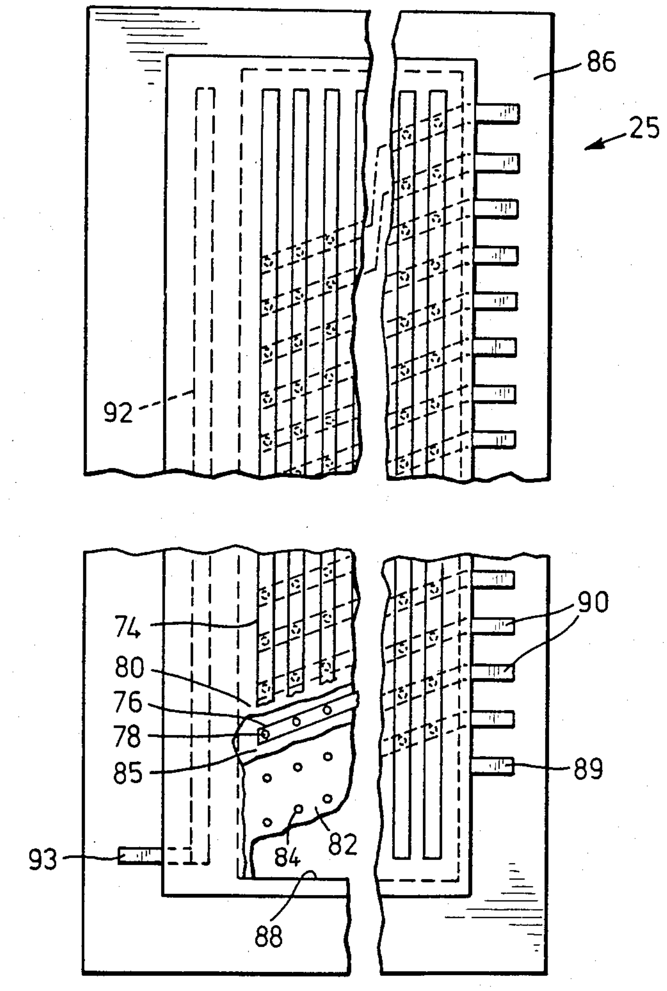
FIG. 3 shows a plan view of the print cartridge.

The print cartridge 25 with its ion deposition matrix and erasehead overcomes these problems, and is illustrated in partial plan view in FIG. 3.

The cartridge 25 comprises a board 86 of insulating material formed with an opening 88 at the underside of the insert (seen better in FIG. 2). The apertures 84 of which form the orifices through which ions are discharged onto the drum dielectric layer 28 and which is connected to a contact tab 89 on the board 86, and the intermediate apertured layer 85 of insulating material on top of the screen 82 are interposed between the board 86 and the finger electrodes 76, the screen 82 and intermediate insulating layer 85 extending across the opening 88.

The finger electrodes 76 have their openings 78 aligned with those in the screen, and intermediate insulating layer 85 and are also formed with contact tabs 90.

The insulating layer 80 is interposed between the finger electrodes 76 and the drive electrodes 74, which extend longitudinally of the insert 25, i.e. parallel to the axis of the drum 27.

The erase head is formed by a corona wire 92 provided with a contact tab 93.

When the print cartridge 25 is located in the printing apparatus as described above, the spring-biased pins 102 engage the tabs 89, 90 and 92 for providing electrical contact to the printed circuit boards 16 which control the operation of the cartridge 25.

Although, as will be readily apparent to those skilled in the art, various configurations of the print cartridge 25 are possible, the present cartridge is so constructed that there are sixteen drive lines or electrodes 74 and one hundred and twenty eight finger electrodes 76. This arrangement enables the individual ion generators, such as that illustrated in FIG. 2, to be spaced far enough apart to make manufacture practical and economical, and also reduces the number of circuits required to energise the ion generators of the ion deposition matrix from over 2000 to 144.

When the ion generators are arranged in this way it has the result that it is no longer possible for the ion generators to simultaneously form the dots constituting a straight line extending across a page. The ion generators are spaced apart, in the direction or rotation of the drum as described below, and are consequently distributed over an area covering forty six lines of the raster scan. If the above-mentioned number of dots per line, i.e. 2,040, is rounded off to an even binary value, i.e.

2,048, then the area covered by the ion generators represents 94,208 dots.

It is the function of the electronic circuitry in the housing 14 to effect reformatting of the incoming raster scan data so that all positions on a page can be printed, i.e. the incoming data is manipulated and the ion deposition matrix scanned so as to deposit ions at appropriate locations to produce a desired printed image.

Figure 4:
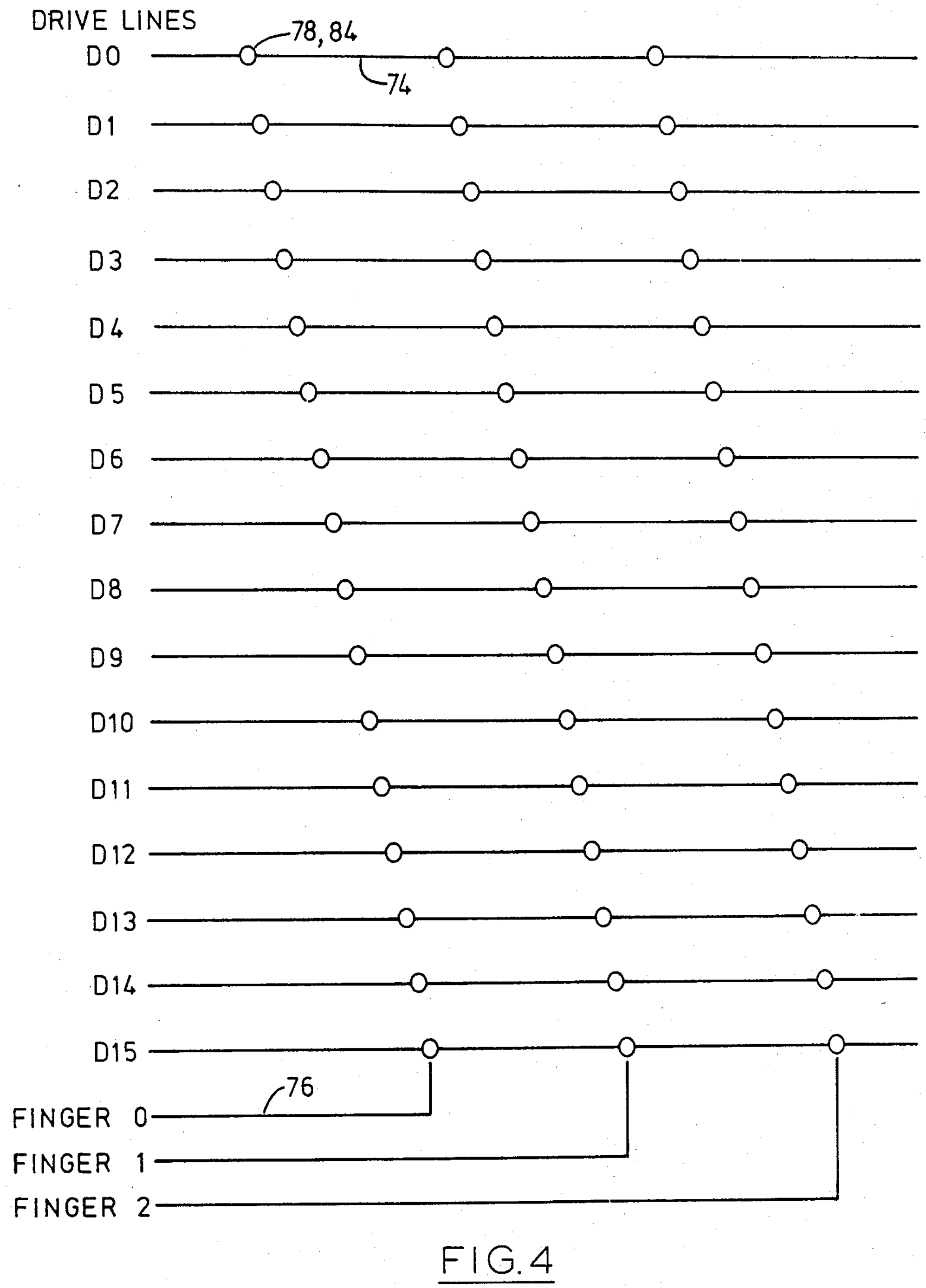
FIG. 4 shows a diagram of the print cartridge for facilitating description of the operation thereof.

The manner in which this is done will now be described with reference to FIG. 4, which diagrammatically illustrates part of the ion deposition matrix. Sixteen drive lines, numbered as D0 through D15, and three of the 128 finger electrodes, numbered as F0, F1 and F2 are shown.

Drive lines D0–D15 are spaced apart by a spacing equal to three raster scan lines and thus the rows of ion generators are spaced apart, in the direction of rotation of the drum, by the same amount.

Each of the drive lines D0–D15 is intersected by each of the finger electrodes and thus has one hundred and twenty eight ion generators spaced apart along the respective drive line by the spacing between sixteen of the dots in the raster scan.

Thus, if a printed page is considered as being composed of horizontal dot rows and vertical dot columns, the drive lines are associated with the dot columns as follows.

| Drive Line | Dot Column |
|---|---|
| D0 | 0,16,32,48 . . . 2032 |
| D1 | 1,17,33,49 . . . 2033 |
| D2 | 2,18,34,50 . . . 2034 |
| D3 | 3,19,35,51 . . . 2035 |
| : | : |
| : | : |
| : | : |
| : | : |
| D14 | 14,30,46,62 . . . 126 |
| D15 | 15,31,47,63 . . . 2047 |

Therefore, each raster scan line of 2048 bits is reformatted into sixteen groups G0–G15. This reformatting is achieved by using a group of 4 random-access-memories (RAM's) in the interface board 16*a* (FIG. 9). The 8-bit words (2 bytes) of data are stored in each memory successfully. Therefore, RAM 1 receives bits 0–15, RAM 2 receives vits 16–31, RAM 3 receives bits 32–47, RAM 4 receives bits 48–63 and Ram 1 receives bits 64–79 and so on continuously storing the raster scan digital input data. Group G0 is formed by taking, in sequence, the first bits in every 5th address line of the rams re address line 0, giving dot column number 0, 16, 32, 48, address line 5, giving dot column number 64, 80, 96, 112 and so on until 128 bits re stored. This process is repeated with the second bits to give G1 and so forth to G15. The reformatted groups G0–G15 are then stored in memory on storage card 16*b*. Each of these groups has 128 bits and each of these groups corresponds to the dots which will be printed by a respective one of the drive lines. Since, as indicated above, the drive lines are spaced three raster scan lines apart, when the drive line D0 is positioned over raster scan line n, drive line D15 is positioned over raster scan line n+45.

Data forming the first of the above-mentioned groups, referred to as group G0 of raster scan line n, is first sent to the circuitry for energizing the fingers, which is described below. The drive line D0 is then energized, and in this way ion generators along the drive line D0 are selected for operation depending on the data values.

Group G1 of raster scan line n+3 is then, after a predetermined period of time, caused to energize selected finger electrodes, while simultaneously drive line D1 is energized, so that selected ion generators on drive line D1 are operated. Group G2 of raster scan line n+6 is then energised whilst drive line $D_2$ is simultaneously energised whereby ion generated on drive line $D_2$ are operated.

The drive lines D0–D15 are energized successively in this way until the entire ion deposition matrix has been scanned, whereupon the electrostatically chargeable drum 27 rotates through a distance corresponding to the spacing between two successive raster lines, such motion being sensed by the use of a shaft encoder on the electrostatically chargeable drum 27, as described below.

The entire ion deposition matrix is then scanned again, applying data for the raster scan lines n+1 through raster scan line n+46.

Figure 5:
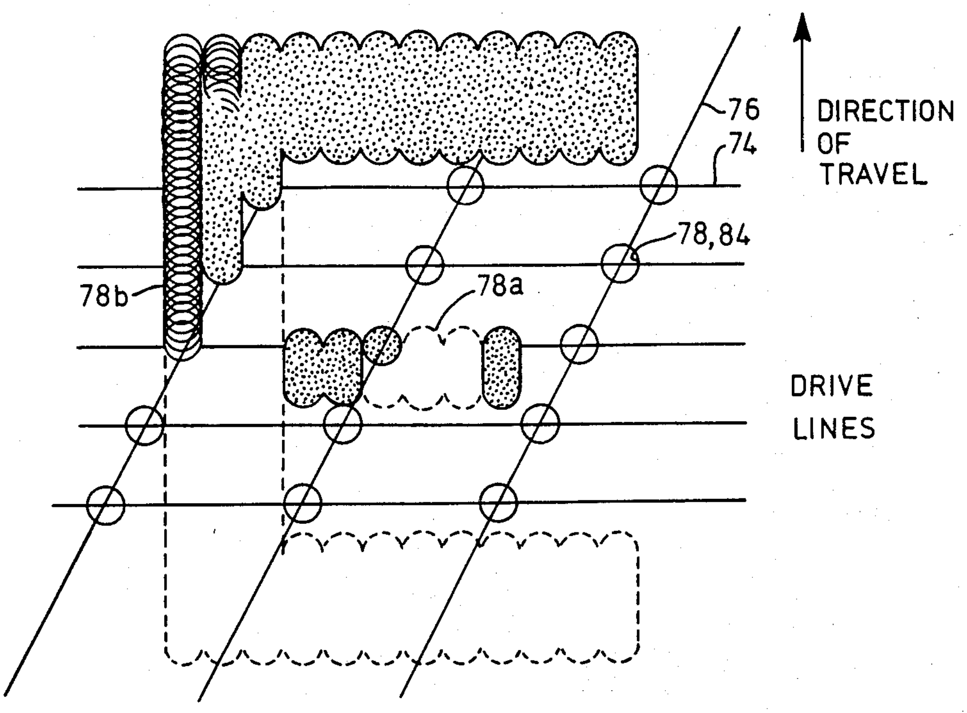
FIG. 5 diagrammatically represents part of a charge image being formed by part of the print cartridge.

The manner in which the image is formed by these successive scannings is illustrated in FIG. 5, which shows the character E partially formed. The printed dots are slightly larger than the openings 78, 84 and overlaps as shown 78*a* so that the impression of the final image is one of continuous lines 78*b*.

The scan period is less than the time for the drum to move one dot spacing, i.e. 1/240 inch of drum surface movement. However, the drum moves in the opposite direction to the scanning direction of the ion deposition matrix, and the spacing of the apertures in the direction of the drum rotation is slightly less than 3/240 inch to correct this rotation. Therefore the effect of drum movement or charge deposition pattern on the drum surface is negligible, although this correction factor is for a specific drum speed.

Figure 6:
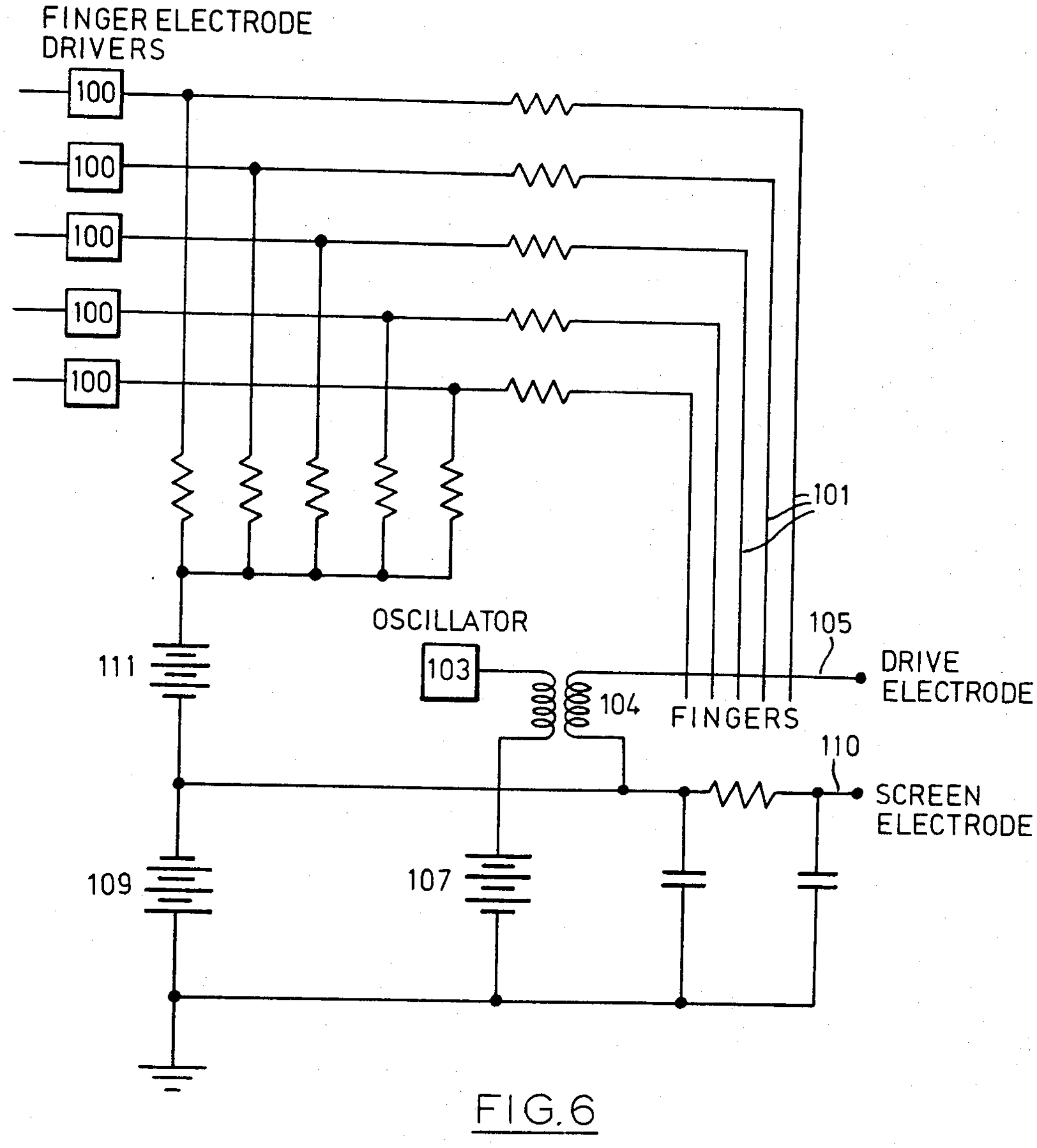
FIG. 6 illustrates electric circuitry employed for energizing electrodes of the print cartridge.

The high voltage circuitry for energizing the drive and finger electrodes and the screen is illustrated in FIG. 6. Each of the finger electrodes is provided with a respective finger driver circuit 100, of which only five are shown in FIG. 6 for convenience of illustration and which are connected to the finger electrodes through conductors 101 connected to spring biased contact pins 102 (FIG. 1) at the underside of the housing 14.

Each of the drive electrodes is provided with a respective oscillator 103, only one of which is shown in FIG. 6 and which is connected through a transformer 104, a conductor 105 and a respective one of the contact pins 102 to the respective drive electrode.

A d.c. source 107 is provided for supplying the oscillator 103, a d.c. source 109 is provided for applying a voltage to the screen 82 through conducter 110 and respective one of the contact pins 102 and a d.c. source 111 is connected between the finger drivers 100 and the conducter 110 for providing a back bias.

The oscillators 103 are switched on and off by the digital logic in a time multiplexed sequence. The finger driver circuits superimpose voltage pulses on the d.c. potential difference that exists between the finger electrodes and the dielectric layer 28 of the drum 27.

The control of the finger driver circuits 100 and the oscillators 103 will now be described with reference to FIGS. 7 to 11 of the accompanying drawings.

Figure 7:
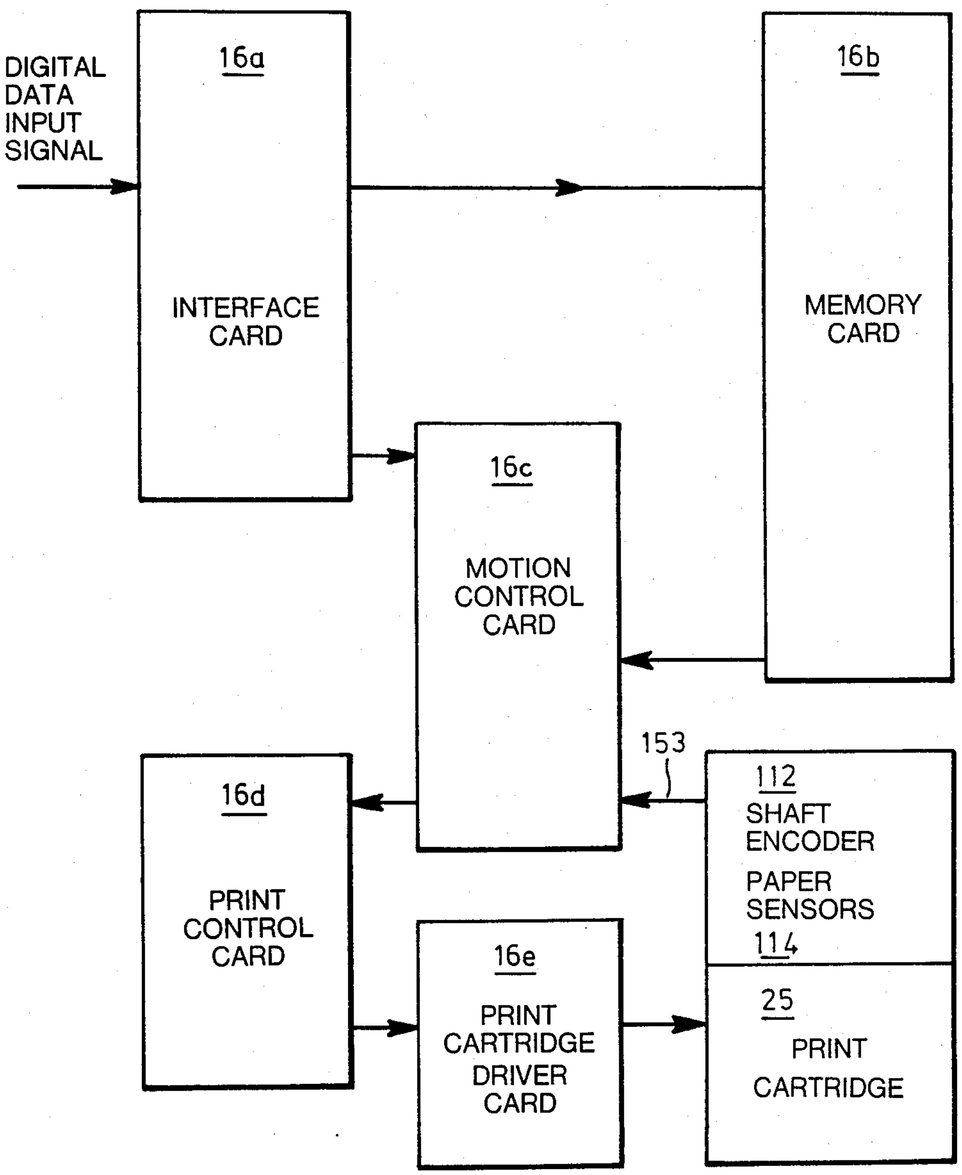
FIG. 7 shows a block diagram of electronic components for controlling the operation of the print cartridge.
Figure 10:
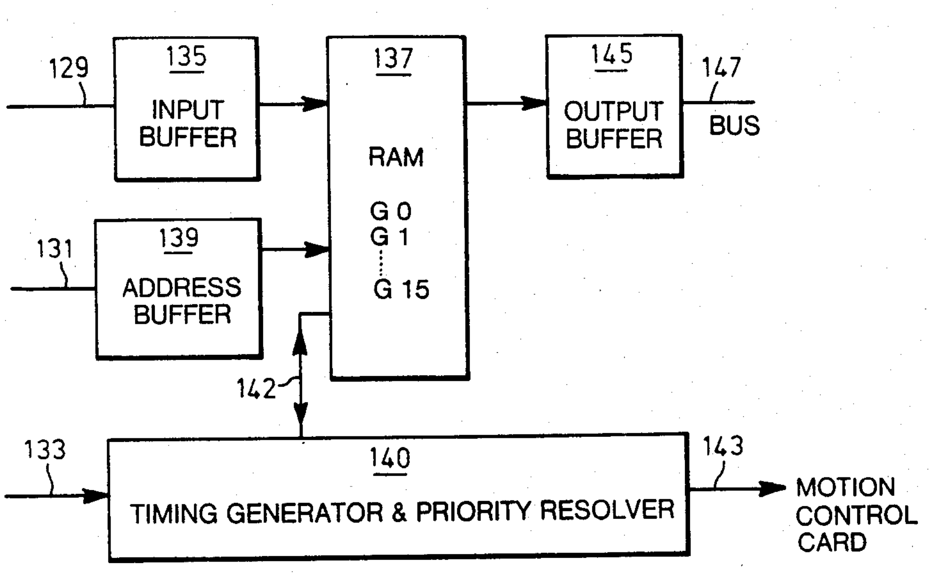
FIG. 10 shows a more detailed block diagram of the storage card forming part of the apparatus of FIG. 8.

Referring firstly to FIG. 7, which shows various printed circuit cards 16 contained in the housing 14 shown in FIG. 1, designated by reference numerals 16*a*, 16*b* etc., an interface card 16*a* is provided for receiving through an interface the digitally encoded data incoming from the data processing apparatus or the like, referred to above, employed in conjunction with the present electrostatic printing apparatus 10.

The interface card 16*a* is connected to a storage card 16*b* and to a motion control card 16*c*, which in turn is connected through print control cards, of which one is shown and indicated by reference numeral 16*d*, to print cartridge driver cards 16*e*.

The motion control card 16*c* is also connected to a shaft encoder 112, for sensing the rotation of the electrostatically chargeable roller 27, and paper sensors 114 for sensing the passage of the copy paper sheet 32, while the driver card 16*e* is connected to the ion deposition matrix and erase head by the conductors 101, 105 and 110 (FIG. 6), the finger drivers 100 and the oscillators being provided on the driver cards.

Figure 8:
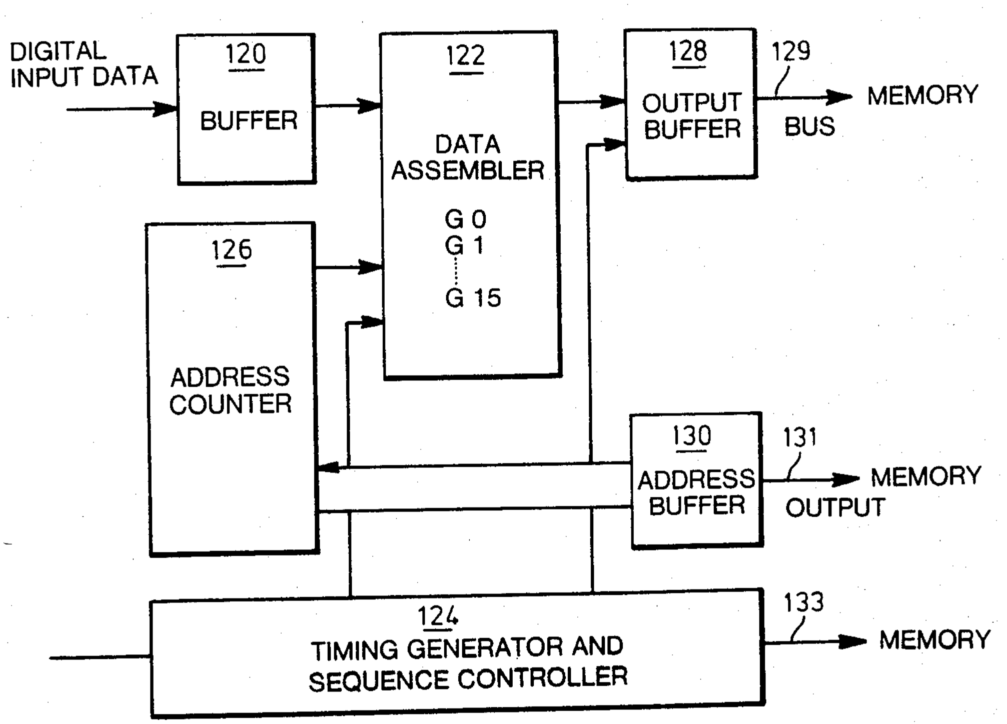
FIG. 8 shows a more detailed block diagram of the interface card of FIG. 7.

The interface card 16*a* is shown in greater detail in FIG. 8 and includes an input buffer 120 which accepts data incoming to the electrostatic printing apparatus 10, the output of the input buffer being connected to data assembler 122 which has RAMS 1–4 in which the bits of the raster scan signal are arranged into the groups G0, G1, G15.

Timing generator and sequence controller 124 receives timing and sequence data input from the interface, including a start signal, and controls address counter 126.

The data assembler 122 assembles the incoming data into the groups G0, G1 etc. referred to above and, through an output buffer 128 and bus 129, stores the data groups in the storage cards 16*b*.

Address buffer 130 outputs address data through line 131 to the storage cards 16*b* and timing generator and sequence controller 124 is connected through line 133 to the storage card 16*b*. The data transmission system is asynchronous and 128 groups of raster scan data can be stored at any instant to provide a buffer against variation in the data input rate.

More particularly, as shown in FIG. 9, which illustrates the storage card 16*b* in greater detail, the bus 129 is connected through an input buffer 135 to random access memory 137, into which each raster scan line is stored sequentially, the data within each raster scan line being stored in the sequence of the group numbers G0, G1, etc.

The address data on line 131 is passed through address buffer 139 to the random access memory 137 and the data on line 133 is passed to a timing generator and priority resolver 140, having an output line 142 connected to the random access memory 137 and a further output line 143 connected to the motion control card 16*c*.

The output of the random access memory 137 is connected through output buffer 145 and bus 147 to the motiion control card 16*c*.

Figure 11:
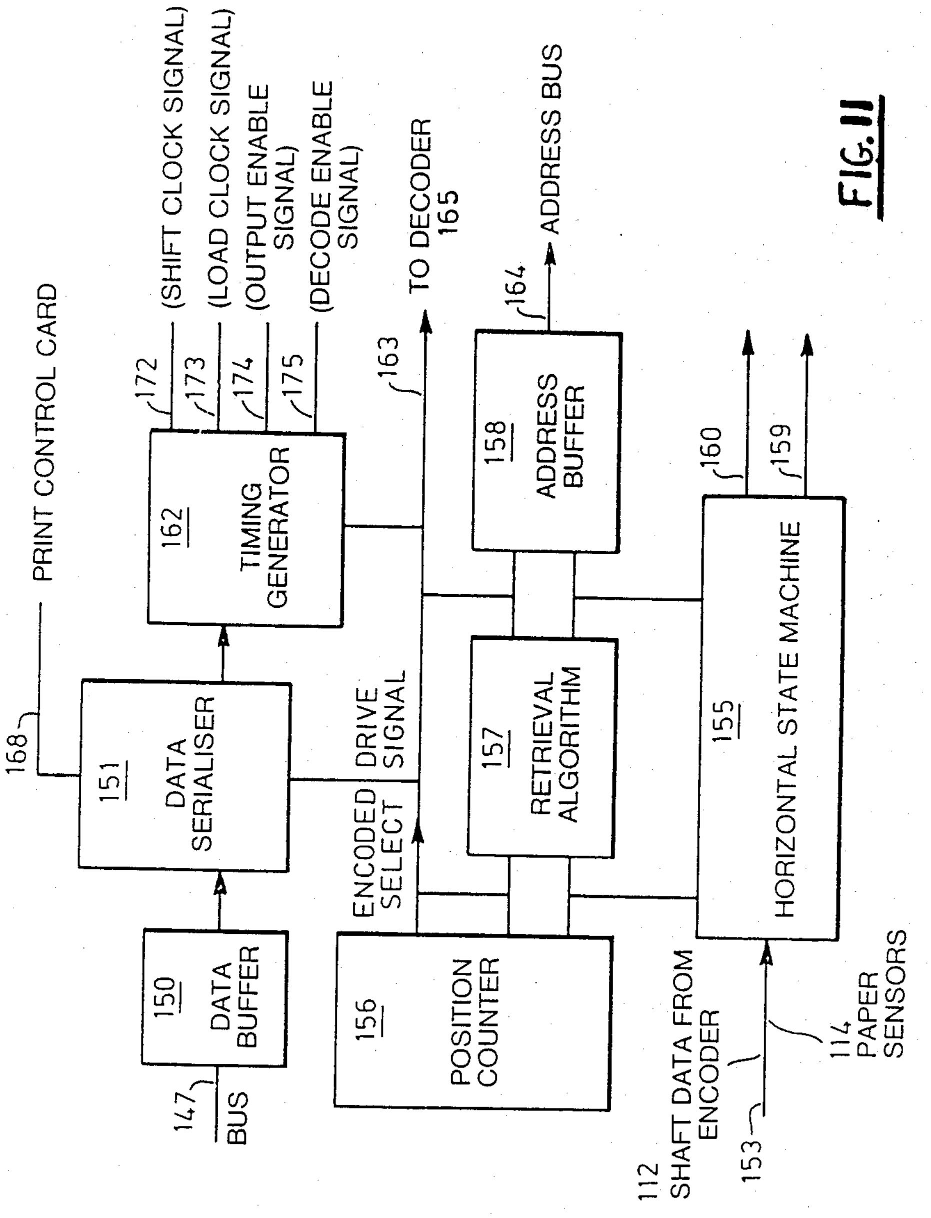
FIG. 11 shows a more detailed block diagram of the motion control unit shown in FIG. 8.

The motion control card 16*c* is shown in greater detail in FIG. 11 and comprises data buffer 150 connected to bus 147 and to a data serializer 151.

Data supplied to the motion control card 16*c* from the storage card passes through the bus 147 and the data buffer 150, is serialized by the data serializer 151 and is passed to the print control card 16*d* through line 168.

Horizontal state machine 155 receives data on line 153 from the shaft encoder 112 and the paper sensors 114 for controlling the timing of the operation of the ion deposition matrix.

Position counter 156 provides on line 163 an encoded drive select signal to a decoder 165 in the print control card 16*d* and the output from the decoder controls the operation of the drive electrode oscillators 103. The position counter 156 also provides an output to retrieval algorithm 157 which is connected through an address buffer 158 to address bus 164.

Figure 12:
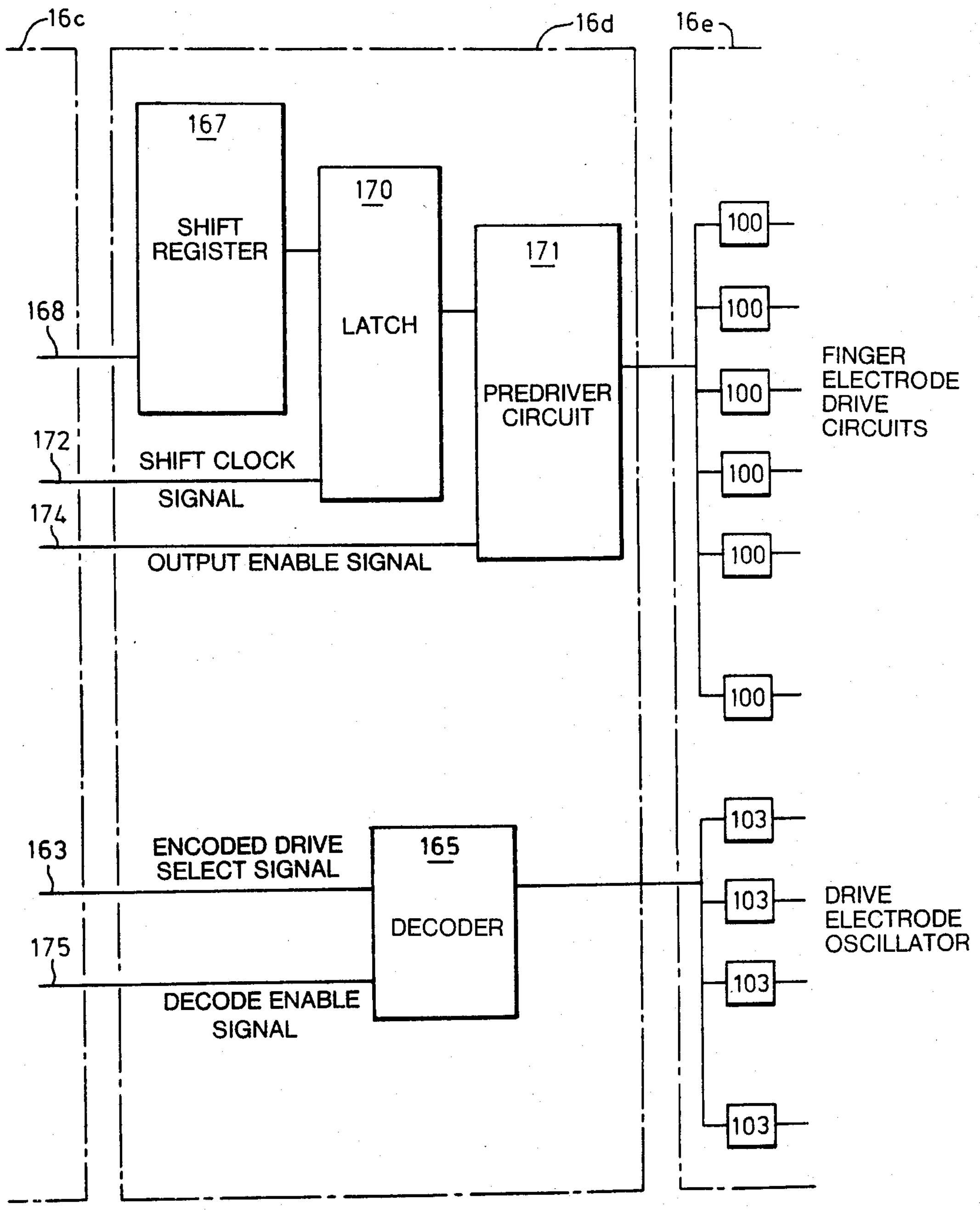
FIG. 12 shows a more detailed block diagram of the print control unit forming part of the apparatus of FIG. 8.

The print control card 16*d* (FIG. 12) further includes a shift register 167, a latch 170 and a predriver circuit 171, which controls the operation of the finger electrode driver circuits 100. Timing generator 162 in the motion control card 16*c* provides on line 172 a shift clock signal to the shift register, on line 173 a load clock signal to the latch 170, on line 174 an output enable signal to the predriver 171 and on line 175 a decode enable signal to the decoder 165.

The output of the position counter 156 is supplied to data serializer 151 and to timing generator 162 and, in addition, through lines 163 and 164 to the print control cards.

As shown in FIG. 11, each print control card has a decoder 165, which decodes the information on lines 163 and 164 for controlling the oscillators 103 energizing the drive electrodes.

A shift register 167 receives serial data on line 168 from the data serializer 151 (FIG. 12) and outputs through latch 170 and predriver 171 to the finger driver circuits 100.

I claim:

1. Apparatus for controlling the operation of a matrix of ion deposition points of an electrostatic printer, the ion deposition points being defined by the intersection of a plurality of first electrodes with a plurality of second electrodes to provide a pattern of charge on a rotatable electrostatically chargeable surface corresponding to an image represented by a digital raster scan signal, the plurality of first electrodes being parallel to the axis of rotation and the plurality of second electrodes being located transverse to said plurality of first electrode in a common plane, the apparatus comprising:

data reformatting means for receiving a digital raster scan input signal, said data reformatting means processing the digital input signal into a plurality of data groups, each data group having the same number of bits, the number of bits being the same as the number of second electrodes, and the number of groups being the same as the number of first electrodes, memory means connected to the data reformatting means for storing the data groups, motion control means responsive to the rotation of the chargeable surface to initiate a scanning operation to energize, in a predetermined sequence, the matrix of ion deposition points.

first electrode energizing means connected to said motion control means to energize said plurality of first electrodes successively during said scanning operation in accordance with the data groups stored in the memory means second electrode energizing means for energizing said plurality of second electrodes in accordance with the data in a respective one of said data groups during the energization of the corresponding first electrodes, said energization being continuously performed in accordance with the data in the memory means whereby, in use, a pattern of charge is deposited on said rotatable electrostatically changeable surface corresponding to the image read by the digital raster scan signals.

2. Apparatus as claimed in claim 1, further comprising means for initiating one of said scanning operations in response to each rotational advance of said drum through a predetermined distance, and adjacent electrodes, of said first electrodes being equally spaced by a multiple of said predetermined distance.

3. Apparatus as claimed in claim 2, further comprising means for sensing a copy material, said motion control means being responsive to said sensing means for enabling scanning operation in response to a signal from said sensing means.

4. Apparatus as claimed in claim 1 wherein the memory means capable of storing digital data representing at least forty-six raster scan lines simultaneously.

5. Apparatus as claimed in claim 1 wherein the ion deposition matrix is scanned in less time than it takes the drum to move a distance corresponding to the spacing between two raster scan lines.

6. Apparatus as claimed in claim 1 wherein the raster scan input signal is reformatted into sixteen data groups, each having 128 bits, there being sixteen first electrodes and 128 second electrodes.

7. Apparatus as claimed in claim 1 in combination with an electrostatic printer having a rotatable electrostatically chargeable drum, ion deposition means for forming a latent electrostatic image on said drum;

means for applying a toner to said latent electrostatic image to form a toner image;

means for transferring and fusing said toner image to a copy material; and means for removing residual toner and electrostatic charge from said drum.

* * * * *